United States Patent
Ballingall et al.

(10) Patent No.: US 6,396,045 B1
(45) Date of Patent: May 28, 2002

(54) SENSOR APPARATUS

(75) Inventors: Ronald A Ballingall; Stephen Collins; David J Lees; Gillian F Marshall, all of Malvern (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 09/508,465

(22) PCT Filed: Sep. 18, 1998

(86) PCT No.: PCT/GB98/02843

§ 371 (c)(1),
(2), (4) Date: Mar. 10, 2000

(87) PCT Pub. No.: WO99/17541

PCT Pub. Date: Apr. 8, 1999

(30) Foreign Application Priority Data

Sep. 26, 1997 (GB) .............................................. 9720384
Nov. 11, 1997 (GB) .............................................. 9723742

(51) Int. Cl.⁷ .............................................. H01L 27/00
(52) U.S. Cl. ................................ 250/208.1; 250/214 C
(58) Field of Search .......................... 250/208.1, 205.1, 250/201.1, 201.2, 201.4, 214 C; 396/79, 80, 120, 121; 355/55, 56, 53

(56) References Cited

U.S. PATENT DOCUMENTS 4,065,788 A    12/1977  Meier et al.
5,155,348 A    10/1992  Ballingal et al.
5,296,696 A  *  3/1994  Uno ......................... 250/208.1
5,446,283 A  *  8/1995  Dautriche .................... 250/332

FOREIGN PATENT DOCUMENTS

EP    0521255    1/1993
EP    0647064    4/1995
GB    2147172    5/1985

* cited by examiner

Primary Examiner—Robert H. Kim
Assistant Examiner—Courtney Thomas
(74) Attorney, Agent, or Firm—Nixon & Vanderhye P.C.

(57) ABSTRACT

The invention provides a sensor apparatus (200) with compensated signal processing for generating a sensor signal corresponding to a filtered image of a scene. The apparatus (200) incorporates a multielement array (52) for providing at each element (58) first and second signals in response to first and second scene images projected onto it and a lens assembly (204) for projecting the images onto the array (52). Each element (58) is connected to an associated circuit (300). Each circuit (300) performs a subtraction of the first and second signals of its associated element from one another to provide a difference signal and supply this signal for use in generating the sensor signal. Each circuit (300) incorporates a transistor ($T_{17}$) for injecting charge to compensate at least partially for subtraction accuracy degrading parasitic charge injection occurring within the circuit (300) when the apparatus (200) switches between projecting the first image and the second image onto the array (52).

29 Claims, 8 Drawing Sheets

SENSOR APPARATUS

BACKGROUND OF THE INVENTION

1. Field of the Invention

This invention relates to a sensor apparatus for sensing radiation from a scene. It also relates to a method of sensing such radiation.

2. Discussion of Prior Art

Sensor apparatus for sensing radiation from a scene are well known in the prior art. They find widespread application, for example, in portable consumer video and digital cameras and also in thermal imagers as employed by emergency services.

A typical apparatus incorporates a sensor comprising a two-dimensional array of elements, each with an associated signal processing circuit. Radiation from a scene is projected onto the array where each element responds via its associated processing circuit with an output $S_k$ as given in equation [1]; the index k here is used to identify elements uniquely, i.e. $S_k$ is the output from the $k^{th}$ element circuit. The output $S_k$ includes unwanted artefacts which arise either from the scene itself or are generated within its associated element or processing circuit:

$$S_k = A_k(Rf_k, Rped_k) + B_k + N_k \quad \text{Eq. 1}$$

where $S_k$=output generated from $k^{th}$ element via its associated processing circuit;

$A_k$=$k^{th}$ element responsivity function;

$Rf_k$=feature information or scene contrast radiation from the scene received at the $k^{th}$ element;

$Rped_k$=background radiation from the scene received at the $k^{th}$ element;

$B_k$=offset signal generated within the $k^{th}$ element and its associated processing circuit; and $N_k$=noise generated within the $k^{th}$ element and its associated processing circuit.

The outputs $S_k$ from each element are combined to provide a sensor signal.

The artefacts generated within the sensor may arise, for example, from offset potentials generated within its processing circuits; these offsets can arise from circuit device semiconductor bandgaps or from transient charge injection effects when processing signals within the circuits.

The sensor including its associated circuits may be based on charge coupled devices (CCDS) or metal oxide semiconductor (MOS) devices. When MOS devices are employed, it is found that there is a noticeable variation in responsivity function $A_k$ amongst the elements, namely the elements have differing responsibilities and give different outputs $S_k$ in response to the same received radiation intensity. This variation is often larger than that of sensors incorporating charge-coupled devices (CCD). It has prevented widespread use of sensors incorporating MOS devices in consumer video cameras in preference to sensors incorporating CCDs despite a long-felt want to do so in order to benefit from the compatibility of MOS detection and processing circuitry; providing power supply and control signals for operating MOS devices tends to be less complex and less expensive compared to providing them for operating corresponding CCDs. The variation gives rise to fixed pattern noise (FPN) in the outputs $S_k$ which results in the corresponding sensor signal depicting a speckled scene. Moreover, there is also a variation in offset signal $B_k$ amongst the elements, and the responsivity function $A_k$ and the offset $B_k$ are often dependent upon sensor temperature. For sensors employed to respond to diminished radiation intensities, noise $N_k$ generated within their elements and associated processing circuits often becomes a problem, in particular flicker noise contributing to $N_k$ which has a noise spectral density which increases inversely relative to frequency.

When the sensor receives infra-red radiation from the scene, each output $S_k$ is found to comprise an unwanted pedestal component, corresponding to a general background temperature of the scene, together with a desired feature component, namely corresponding to temperature variations within the scene. This is particularly pertinent where:

(i) the scene is at an ambient temperature of approximately 300K; and (ii) the temperature variations within the scene giving rise to the feature component are less than 1K.

The pedestal component may often be a factor of one thousand or more larger than the feature component. This results in poor signal contrast which may render the temperature variations difficult to identify in the outputs $S_k$ unless further signal processing is applied thereto.

The presence of the pedestal component imposes constraints and limitations on design and performance of a sensor apparatus for sensing emissions from a scene, especially infra-red emissions therefrom. The apparatus may, for example, need to incorporate analogue-to-digital conversion circuits providing a large dynamic range corresponding to 12-bits or more so that both the pedestal component and the feature component may each be resolved in data provided by the circuits. Moreover, the unwanted pedestal component may result in problems of saturation in sensor apparatus which analogue integrate photodetector signals in order to provide improved apparatus signal-to-noise performance.

A solution which addresses the problem of pedestal component described above is provided in a U.S. Pat. No. 5,155,348 which describes a read-out circuit for a sensor comprising a two-dimensional array of 128×128 photodetector elements responsive to infra-red radiation where each element is connected to its respective read-out circuit. In U.S. Pat. No. 515,534, the circuit is described as operating in calibration and measurement phases.

During the calibration phase, a calibration image is projected onto the elements. The image may correspond to a featureless calibration object of similar temperature to a scene to be viewed or a totally blurred featureless uniform image of the scene. Each element generates a signal in response to the calibration image and its respective circuit is arranged to store a calibration signal on a storage capacitor $C_c$ incorporated within it corresponding to a signal generated by its respective element in response to the calibration image. This provides a correction for pedestal component across the array.

During the measurement phase, a focused measurement image of the scene is projected onto the array. A measurement signal generated at each element in response to the image has subtracted from it the calibration signal for that element to provide a difference signal. The difference signal is integrated within the circuit onto an integration capacitor $C_s$ incorporated therein to provide an output signal. The circuits each produce a respective output signal which is multiplexed for generating a compound sensor signal.

This solution provides an advantage that the dynamic range of the compound sensor signal is reduced as a result of removing a pedestal component generated at each element. This eases dynamic range performance requirements of remote circuits receiving the sensor signal from the multiplexer, for example allowing use of analogue-to-digital converters of 8-bit resolution instead of 12-bit resolution.

A problem arises with the sensor described in U.S. Pat. No. 5,155,348 when scene contrast radiation $Rf_k$ is greatly diminished relative to the background radiation $Rped_k$, for example where the sensor is used to view a substantially uniform scene incorporating a distant faint object. Inaccuracy when subtracting the calibration signal from the measurement signal can result in the contrast radiation $Rf_k$ being masked by subtraction inaccuracies. One source of inaccuracy is transient charge injection within the element circuits which arises when the circuits are being switched between calibration to measurement phases. Transient charge injection can be conventionally reduced in a circuit as described in the U.S. Pat. No. 5,155,348 by reducing junction capacitances of MOS devices incorporated therein and increasing capacitance of its storage capacitor incorporated therein to provide a modified circuit. This results in a problem that the modified circuit occupies more space when fabricated in monolithic form and its speed of operation is degraded. Reduced speed of circuit operation can result in settling offsets arising when the element circuits are switched between calibration and measurement phases before potentials in the circuit have asymptotically stabilised. Moreover, it limits the rapidity with which image information can be output from the sensor.

SUMMARY OF THE INVENTION

The problems described above are reduced, according to the present invention, by incorporating an additional device into each element circuit. The device is arranged to inject a compensating charge into the circuit to compensate at least partially for transient charge injection arising when the circuit is switched from its calibration phase to its measurement phase. This alleviates the problems of reduced speed of operation and increased size described above for the modified circuit.

According to the present invention, a sensor apparatus is provided for generating a sensor signal corresponding to a filtered image of a scene, the apparatus incorporating:

(i) detecting means incorporating a plurality of detector elements and arranged to derive first and second element signals during first and second detection phases respectively; and (ii) processing means associated with each element for deriving a difference signal from the element signals for use in generating the sensor signal;

characterised in that the processing means incorporates compensating means for counteracting inaccuracies introduced in response to switching the sensor apparatus between detection phases.

The invention provides the advantage that it reduces inaccuracies introduced when the sensor apparatus is switched between first and second phases, thereby improving accuracy of the apparatus when generating the sensor signal.

The sensor apparatus provides sensor signals in which faint distant objects are more identifiable compared to prior art apparatus. This is particularly important when the sensor apparatus is employed for detecting remote hazardous objects, for example in a maritime environment where early sensing for distant vessels representing a collision hazard is important.

The processing means may incorporate:

(i) storing means including a storage capacitor for recordal of a calibration signal therein derived from the first element signal during the first phase; and (ii) current injecting means for injecting current onto the capacitor during the first phase and for providing a current during the second phase in response to the calibration signal recorded during the first phase for use in generating the difference signal, said injection means comprising a programmable current source incorporating self-cascoding MOS FETs.

This provides the advantage that the storing means can be integrated onto an integrated circuit. Moreover, the self cascoding MOS FETs provide the advantage of enhanced operating speed and accuracy.

The processing means may incorporate storing means including a storage capacitor for recordal of a calibration signal therein derived from the first element signal during the first phase; and the compensating means may incorporate a compensating capacitor comprising first and second electrodes, the first electrode connected to the storage capacitor for injecting a compensating charge thereonto and the second electrode arranged to be driven by a compensating signal for counteracting inaccuracies introduced into the storing means when the sensor apparatus is switched between detection phases. This enables the compensating means to be integrated in an integrated circuit.

The compensating signal may be in antiphase to a signal applied to the processing means for selecting the phases. This provides the advantage that an antiphase signal is relatively straightforward to generate and compensation is applied precisely when charge injection inaccuracies potentially arise.

The compensating capacitor may comprise a compensating MOS FET whose channel electrodes are shorted together to provide one of the electrodes of the capacitor and whose gate electrode is arranged to provide another of the electrodes of the capacitor. This provides the advantage of being a practical implementation of the compensating capacitor in an integrated circuit incorporating MOS devices for performing signal processing.

The storing means incorporates an enabling MOS FET for switching itself from the first phase where it stores its respective calibration signal into its storage capacitor to the second phase where it provides the calibration signal, and the compensating MOS FET incorporates a short channel so that its gate-channel capacitance is substantially half that of the enabling MOS FET. Substantially half is defined as being in the range of 25% to 75%. This provides the advantage that the compensating MOS FET provides a compensation capacitance of suitable value for providing effective compensation of inaccuracies arising from charge injection onto the storing means.

The elements and the processing means may be integrated together onto a substrate. This provides the advantage of a compact practical configuration for the sensor apparatus.

The processing means may incorporates interfacing means for interfacing from the processing means to its respective element and for presenting an input impedance to the element less than an equivalent internal impedance of the element, said interfacing means comprising a MOS FET configured in common gate configuration. This provides the advantage of being a practical circuit configuration for interfacing to the elements and providing reduced noise compared to prior art.

The sensor apparatus may incorporate projecting means for projecting first and second images onto the detecting means during the first and second phases respectively, where:

(i) at least one of the images is a projection of radiation from the scene; and (ii) the images are of a differing degree of blurring to one another but neither being fully defocused and each retaining discernible spatial features, thereby enabling the sensor apparatus to provide the sensor signal corresponding to a spatially filtered image of the scene.

Each degree of blurring may be such that radiation from a scene element focussable upon a single element becomes dispersed over a number of elements in the range of one element to 25% of the elements in the detecting means. This provides the advantage of a useful spatial filtration of the sensor signal.

The images may be blurred to a degree which is manually or automatically selectable. This provides the advantage that the degree of spatial filtration provided in the sensor apparatus is selectable to suit alternative uses of the sensor apparatus.

The second image may be blurred to a greater degree than the first image. This provides the advantage of image tone reversal in the sensor signal.

At least one of the first and second images may be a diffuse image. Using a diffuse image provides the advantage that it can be generated using more compact optical components than required for generating a defocused image.

The projecting means may incorporate a liquid crystal spatial light modulator configured to be controllable between a first state where it substantially transmits radiation unscattered and a second state where it transmits and scatters radiation from the scene to the detecting means for generating different degrees of blurring for the first and second images. This provides the advantage of a compact practical arrangement for implementing a diffuse image.

The liquid crystal spatial light modulator may be a polymer dispersed liquid crystal device (PDLC) configured to scatter radiation transmitted through it in one state and transmit light substantially unscattered through it in another state, the states being selectable in response to a control potential applied to the device. This provides the advantage of being a compact and inexpensive approach to generating diffuse images under electronic control without there being a need for mechanical moving parts.

Each element may comprise at least one of a cadmium-mercury-telluride photodiode, a photodiode with MOS readout, a phototransistor with MOS readout, a photogate with MOS readout and a photodiode with CCD readout. These provide the advantage of being sensitive photodetectors which collectively responsive over a wide spectrum of radiation wavelengths, for example wavelengths in a range of 10 $\mu$m to 0.2 $\mu$m.

BRIEF DESCRIPTION OF THE DRAWINGS

In order that the invention might be more fully understood, embodiments thereof will now be described, by way of example only, with reference to accompanying drawings, in which.

DETAILED DISCUSSION OF EMBODIMENTS

Figure 1:
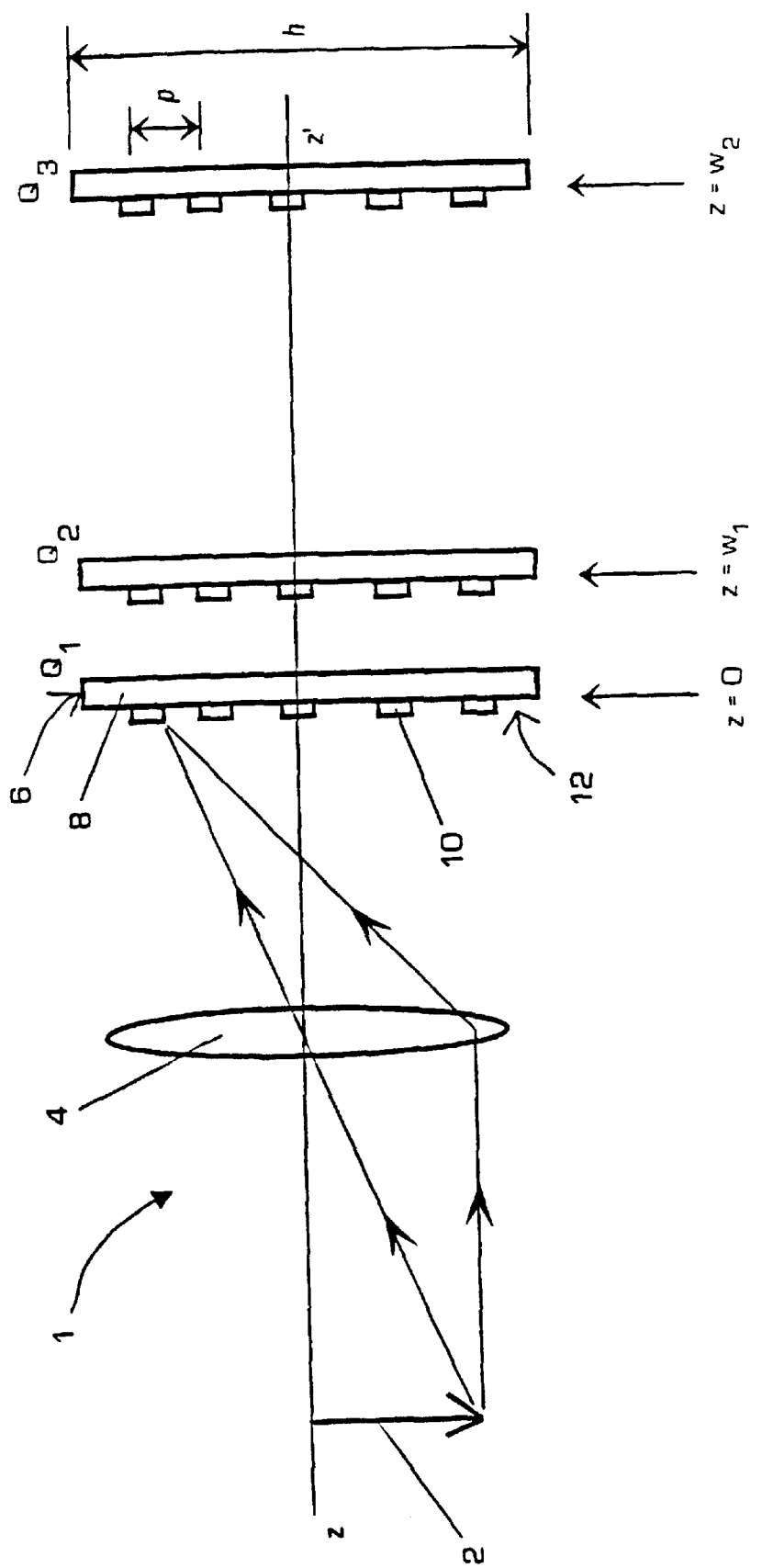
FIG. 1 is a schematic illustration of a prior art sensor apparatus.

FPN reduction will now be described with reference to FIG. 1. In FIG. 1. there is shown a schematic illustration of a prior art sensor apparatus indicated generally by 1. It comprises an object 2, an imaging lens 4 and a focal plane array 6. The array 6 incorporates a substrate 8 onto which an array of uniformly distributed detector elements, such as an element 10, are bonded onto a front element surface 12 thereof. The surface 12 is a rectangular area with a longer side length of h as shown in the diagram. Each element is spaced from its nearest contiguous neighbouring elements by an interelement distance p between centres as shown. The object 2, the lens 4 and the array 6 are located in sequence onto an axis z–z' which perpendicularly intersects the surface 12. The array 6 Is illustrated in three alternative positions, namely positions $Q_1$, $Q_2$, $Q_3$ where focused, partially blurred and featureless blurred uniform images respectively of the object 2 are projected by the lens 4 onto the array 6. At the positions $Q_1$, $Q_2$, $Q_3$, the array 6 is at distances of 0, $w_1$, $w_2$ respectively along the axis z–z'. The elements are arranged to respond to photons emitted from a corresponding region of the object 2 to provide detector signals.

Emitted and reflected radiation from the object 2 which is transmitted through the lens 4 subtends a range of angles of 0 to $\alpha_{max}$ radians relative to the axis z–z' when incident on the array 6 at the position $Q_1$. Radiation incident upon the element 10 of the array 6 in the position $Q_1$ is spread on the surface 12 by a distance of up to $F_{max}$ from the element 10 in the positions $Q_2$, $Q_3$ as provided by equations [2], [3] respectively:

$$F_{max}=\alpha_{max}w_1 \qquad \text{Eq. 2}$$

$$F_{max}=\alpha_{max}w_2 \qquad \text{Eq. 3}$$

For the purpose of this specification, a focused image is one which is substantially in focus, namely where $F_{max}$ is less than the distance p. A partially blurred image is one in which spatial features are discernible but fine spatial features therein are blurred, namely $F_{max}$ is in a range of the distance p to a distance defining an area incorporating to 25% of contiguous elements on the surface 12. A defocused image is one which is uniformly blurred so that spatial features are substantially indiscernible, namely $F_{max}$ is greater than a distance defining an area incorporating 25% of contiguous elements on the surface 12.

Figure 2:
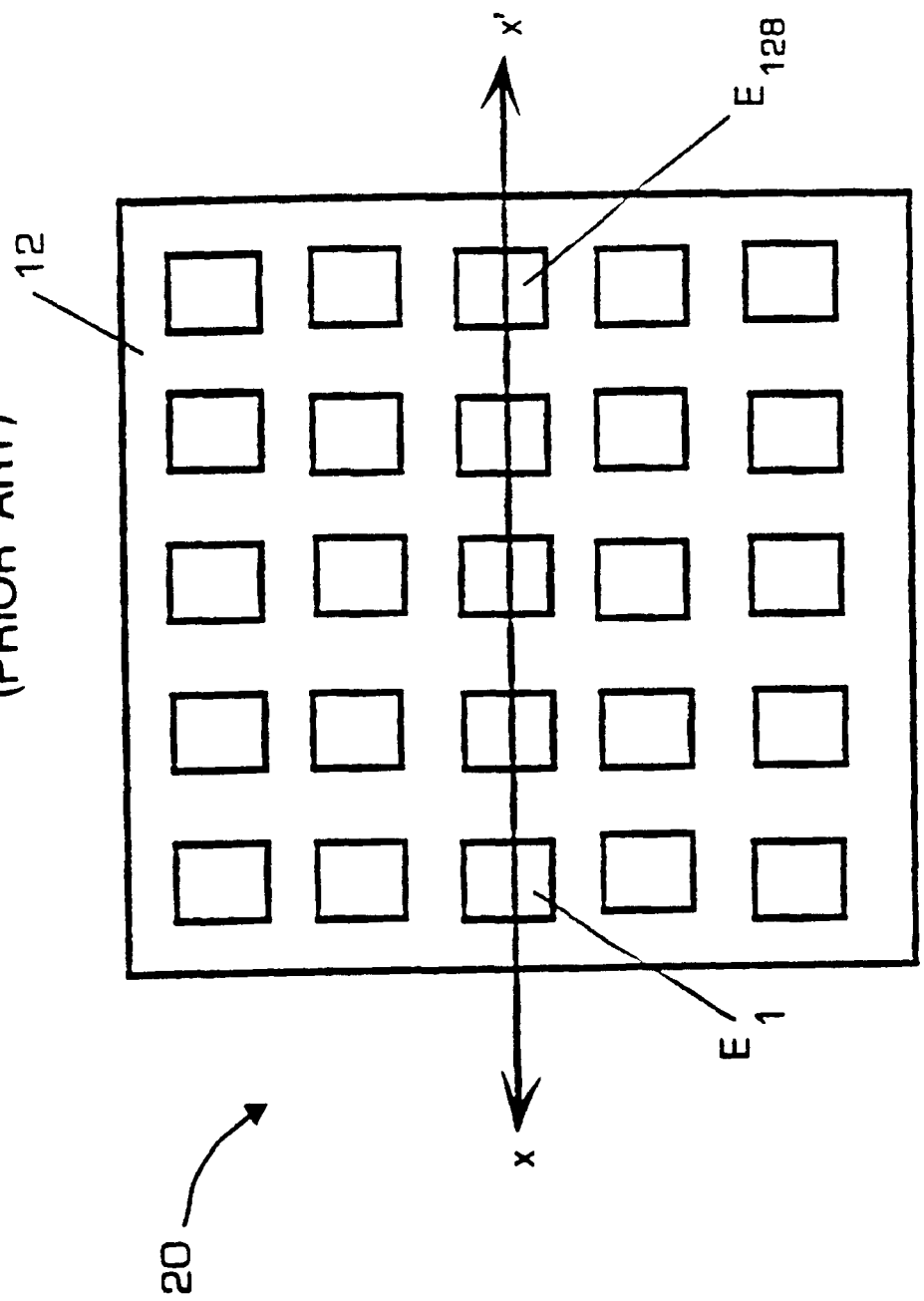
FIG. 2 is a schematic illustration of a prior art focal plane array of the apparatus in FIG. 1.

In FIG. 2, there is shown a front view 20 to the surface 12 of the array 6 in FIG. 1 looking in a direction z–z'. For clarity, an array incorporating a two-dimensional field of 5×5 elements is illustrated in FIG. 2 to represent the array 6 which incorporates a field of 128×128 elements, namely 128 columns of elements and 128 rows of elements. The rows and columns are mutually orthogonal. An axis x–x' is shown which is parallel to the surface 12 and intersects a row of elements, namely a row of elements comprising an element $E_1$ near one edge of the array 6 and an element $E_{128}$ near another edge of the array 6 as shown. Elements $E_2$ to $E_{127}$ are located in a contiguous sequence along the axis x–x' between the element $E_1$ and the element $E_{128}$, for example the element $E_2$ is located between the element $E_1$ and the element $E_3$, the element $E_{127}$ is located between the element $E_{126}$ and the element $E_{128}$, and so on.

Figure 3:
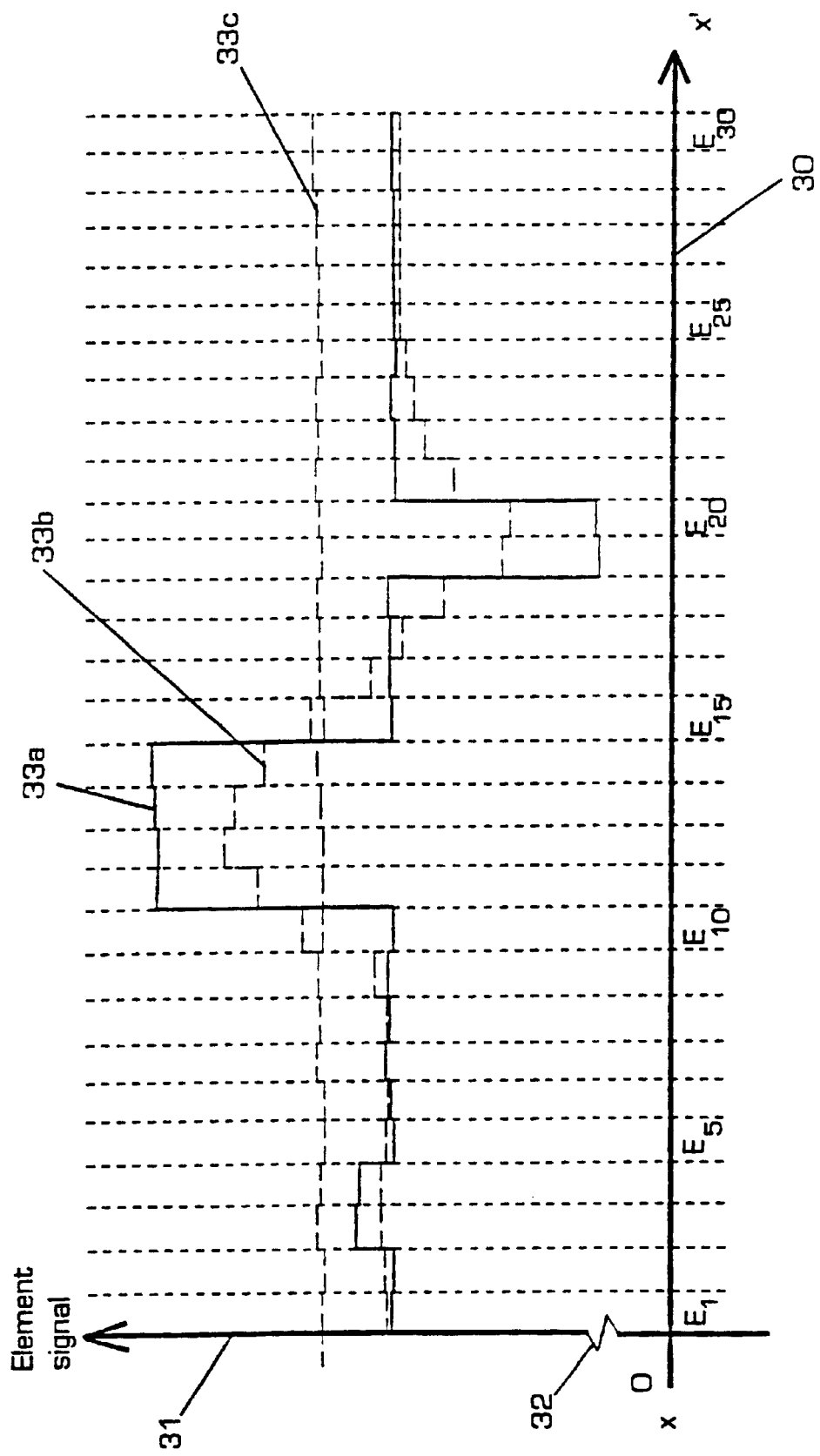
FIG. 3 is a graph of detector signals along an axis on the array in FIG. 2.

In FIG. 3, there is shown a graph of detector signals from each of the elements $E_1$ to $E_{30}$, namely from a row of elements from the element $E_1$ to the element $E_{30}$ which are located approximately quarter of a distance from the element $E_1$ to the element $E_{128}$ along the axis x–x'. The graph has an abscissa axis 30 indicative of element position distance along the axis x–x'. It also has an ordinate axis 31 corresponding to detector signals from the elements. The axis 31 incorporates a discontinuity 32 so that contrast information in the graph is shown exaggerated with reference to the ordinate axis 31. Curves 33a (solid line), 33b (dashed line), 33c (chain line) corresponds to detector signals for the focused image at the position $Q_1$, to the partially blurred image at the position $Q_2$ and the defocused image at the position $Q_3$ respectively. The curve 33a incorporates feature information at the elements $E_3$, $E_4$, $E_{11}$, $E_{12}$, $E_{13}$, $E_{14}$, $E_{19}$, $E_{20}$ corresponding to radiation emission variations in the object 2 arising from temperature variations therein. The variation at the elements $E_3$, $E_4$ is less than the variations at the elements $E_{11}$, $E_{12}$, $E_{13}$, $E_{14}$, $E_{19}$, $E_{20}$. The curve 33c is shown as a line with irregularities; the irregularities arise from variations in element responsivity. The curve 33c corresponds to an average radiation emission from the object 2 and is used as a correction signal for pedestal component removal in the prior art. The curve 33b corresponds to a local average radiation emission from the object 2 which varies locally across the array 6.

Figure 4:
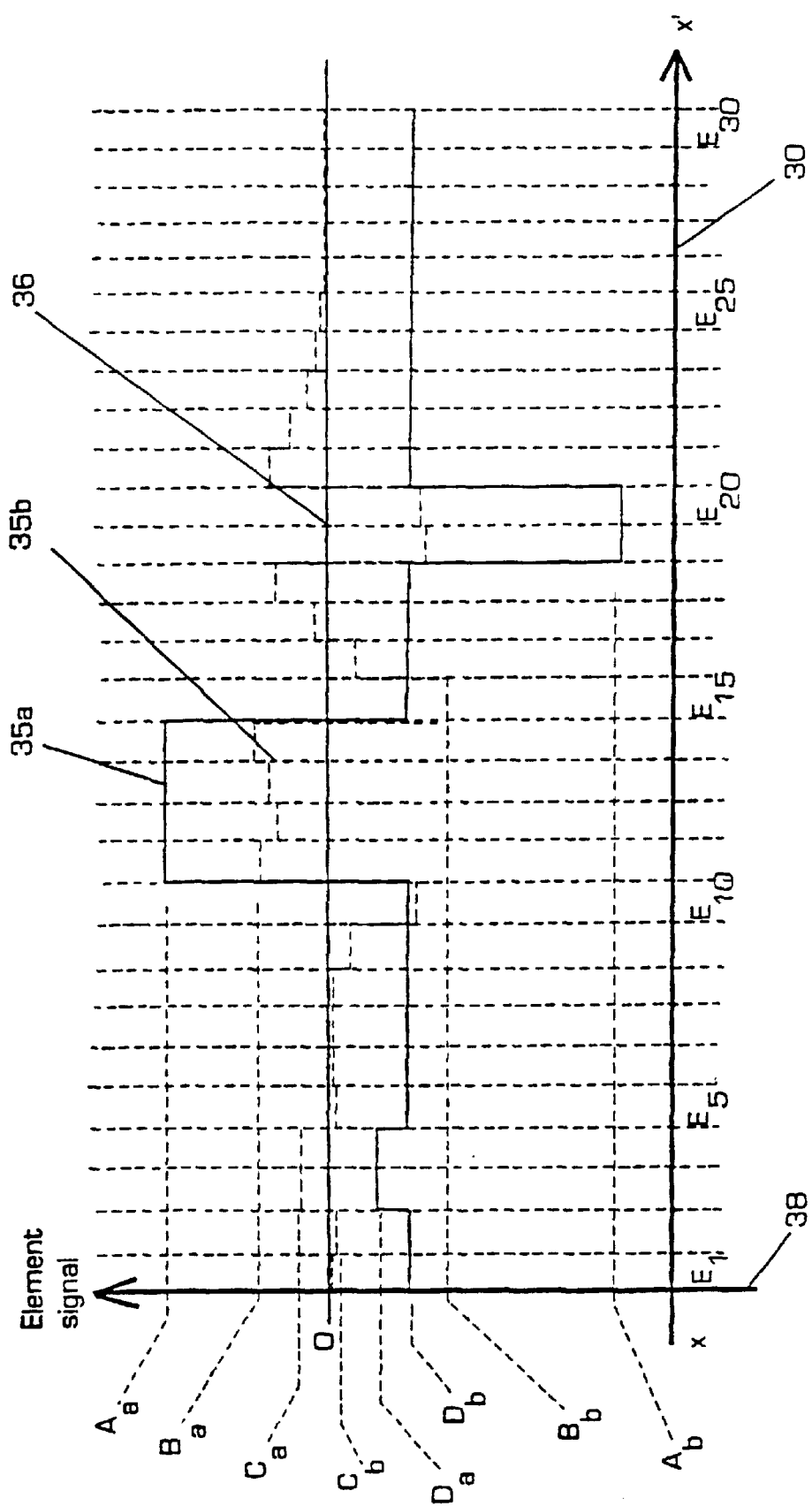
FIG. 4 is a graph of the signals in FIG. 3 corrected by a global pedestal correction and also a local pedestal correction.

In FIG. 4, there is shown a graph of the detector signals from each of the elements $E_1$ to $E_{30}$ where the curves 33b, 33c have been subtracted from the curve 33a to provide curves 35b, 35a respectively. The curves 35a, 35b are shown as solid and dashed lines respectively. The abscissa axis 30 corresponds to distance along the axis x–x' in FIG. 2. A line 36 corresponds to zero value. An ordinate axis 38 corresponds to a corrected element signal where a pedestal component for each element has been subtracted. The curve 35a corresponds to relative spatial emission from the object 2, namely as in a radiometer output. Irregularities in the curve 33a in FIG. 3 are absent in the curve 35a as a result of subtracting irregularities present in the curve 33a; this corresponds to FPN reduction. The curve 35b corresponds to a filtered version of the curve 35a in which local variations in emission from the object 2 are accentuated.

The curve 35a is contained within a first dynamic range of $A_a$ to $A_b$. A local variation at the elements $E_3$, $E_4$ is contained within a second dynamic range of $D_a$ to $D_b$. Removal of local pedestal components results in the curve 35b which is contained within a third dynamic range of $B_a$ to $B_b$. A fourth dynamic range of $C_a$ to $C_b$ contains the local variation at the elements $E_3$, $E_4$ in the curve 35b.

The fourth dynamic range is a larger proportion of the third range compared to the second range as a proportion of the first range, namely.

$$\frac{C_a - C_b}{B_a - B_b} > \frac{D_a - D_b}{A_a - A_b} \qquad \text{Eq. 4}$$

As a result, the curve 35b does not correspond to a relative radiometer output as in the prior art but contains small local variations in emission from the object 2 accentuated relative to larger variations arising from other regions of it. Feature edges are thereby accentuated in the curve 35b which enhances visual intelligibility of the object 2 as determined therefrom.

A degree of partial blurring provided at the position $Q_2$ may be selected to provide a preferred degree of filtration in the curve 35b. If a point in the focused image at the position $Q_1$ is blurred to 100% of the image at the position $Q_2$, the curves 35a, 35b become identical in which case filtration is not obtained. If the degree of blurring is reduced to approach full focus, namely the positions $Q_1$, $Q_2$ are coincident, the curve 35b will be of zero value for all the elements. In practice, the degree of blurring may be selected so that a point in the image at the position $Q_1$ is blurred in a range of spreading of over nearest surrounding contiguous elements (p) to 25% of elements in the array 6. The degree of blurring may be made adjustable, either by manual or automatic control, to provide a desired degree of filtration.

For further explaining operation of the apparatus 1, the image of the object 2 projected by the lens 4 onto the elements E arranged in a Cartesian x-y plane incorporating the surface 12 may be described by an equation [5]:

$$L(x,y,z) = \int \int K(x-x_0, y-y_0, z) L(x_0, y_0, 0) dx dy \qquad \text{Eq. 5}$$

where $x_0$, $y_0$=x-axis, y-axis Cartesian co-ordinates in a plane where z=0 which contains the image in focus, namely at position $Q_1$;

z=z-axis Cartesian ordinate along the axis z–z', for example at position $Q_2$;

x,y=x-axis, y-axis Cartesian co-ordinates in a plane which contains the image blurred when z is not equal to 0, for example at position $Q_2$;

K=blurring function provided by the lens 4; and

L=a function describing the image.

The curve 35b corresponds to a difference signal $D(x_0, y_0)$ which is a difference between first and second images, the first image formed at a z-ordinate of $z_1$=0 at the position $Q_1$, and the second image with a z-ordinate $z_2$=$w_1$ at the position $Q_2$ as described by an equation [6]:

$$D(x,y) = L(x,y,z_1) - L(x,y,z_2) \qquad \text{Eq. 6}$$

In a condition where $w_1$=0, the functions $L(x, y, z_1)$ and $L(x, y, z_2)$ will be identical and will both contain feature information but will result in $D(x, y)$ being zero. This arises if identically blurred images are projected onto the array 6 in the positions $Q_1$, $Q_2$ resulting in the curve 35b devoid of any feature information; this arises if the positions $Q_1$ and $Q_2$ are identical.

By geometrical optical constraints governing the function K, a limit $F_{max}$ to a degree of blurring obtainable from the lens 4 is described by an equation [7]:

$$F_{max} = z \tan \alpha_{max} \qquad \text{Eq. 7}$$

where $\alpha_{max}$=maximum ray semiangle relative to the axis z–z' of radiation forming the image on the array 6.

Thus, if a focused image is presented to the array 6 in the position $Q_1$ where z=0 in equation [7], image features smaller than $z_2 \tan \alpha$ will only be present in a resulting filtered output in the curve 35b represented by $D(x, y)$. These image features will correspond to non-uniform spatial components present in the image which are affected by blurring. These spatial components correspond generally to feature information of importance for interpreting the image.

Figure 5:
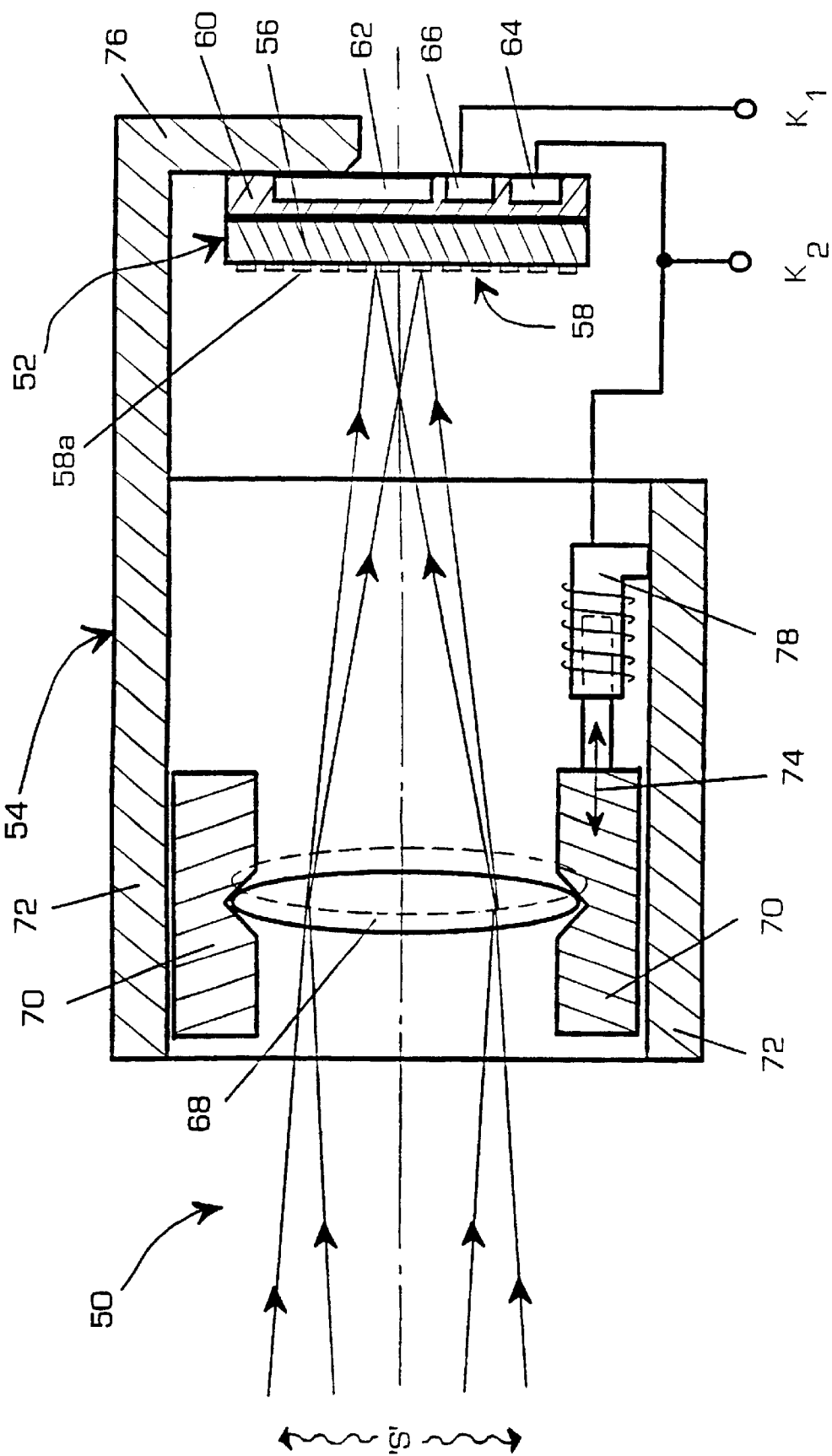
FIG. 5 is a schematic illustration of a prior art sensor apparatus incorporating a focal plane array and a lens assembly.

In FIG. 5, there is shown a schematic illustration of a prior art sensor apparatus indicated by 50. The apparatus 50 comprises a focal plane array 52 and a lens assembly 54 arranged to project an image of a remote scene, represented by 'S', onto the array 52.

The array 52 comprises a substrate 56 incorporating a two-dimensional array of 128×128 cadmium-mercury-telluride (CMT) photodiode elements 58, such as an element 58a, microfabricated onto one face of it. The image of the remote scene is projected onto this face. The elements 58 are arranged to be responsive to infrared radiation, namely radiation whose wavelength is in a range of 1 µm to 15 µm. The array 52 also incorporates a silicon integrated circuit 60 connected to the substrate 56 for processing signals generated by each of the elements 58. The integrated circuit 60 comprises a set 62 of signal processing circuits, namely one processing circuit for each photodiode element 58 on the substrate 56, a logic control circuit 64 and a multiplexer 66. The substrate 56 and the integrated circuit 60 are bonded together to provide a hybrid assembly.

The lens assembly 54 comprises a germanium lens 68 mounted within a movable frame 70 which is constrained within guides 72 to slide linearly away from and towards the array 52 in directions as indicated by an arrow 74. The lens 68 is arranged to be transmissive to infrared radiation. The guides 72 comprise a member 76 onto which the array 52 is mounted. The member 76 incorporates liquid nitrogen and Peltier cooling facilities (not shown) for cooling the array 52 when the apparatus 50 is in operation. The frame 70 is mechanically connected to a bi-directional electromagnetic actuating solenoid 78 which is arranged to move the frame 70 between two positions relative to the array 52, namely a first position where a partially blurred image of the scene is projected onto the elements 58 and a second position where a focused image thereof is projected onto them. A compound output signal is provided from the array 52 at a sensor signal output $K_1$. A control input $K_2$ is provided for controlling the solenoid 78 and the array 52 from remote units (not shown).

Figure 6:
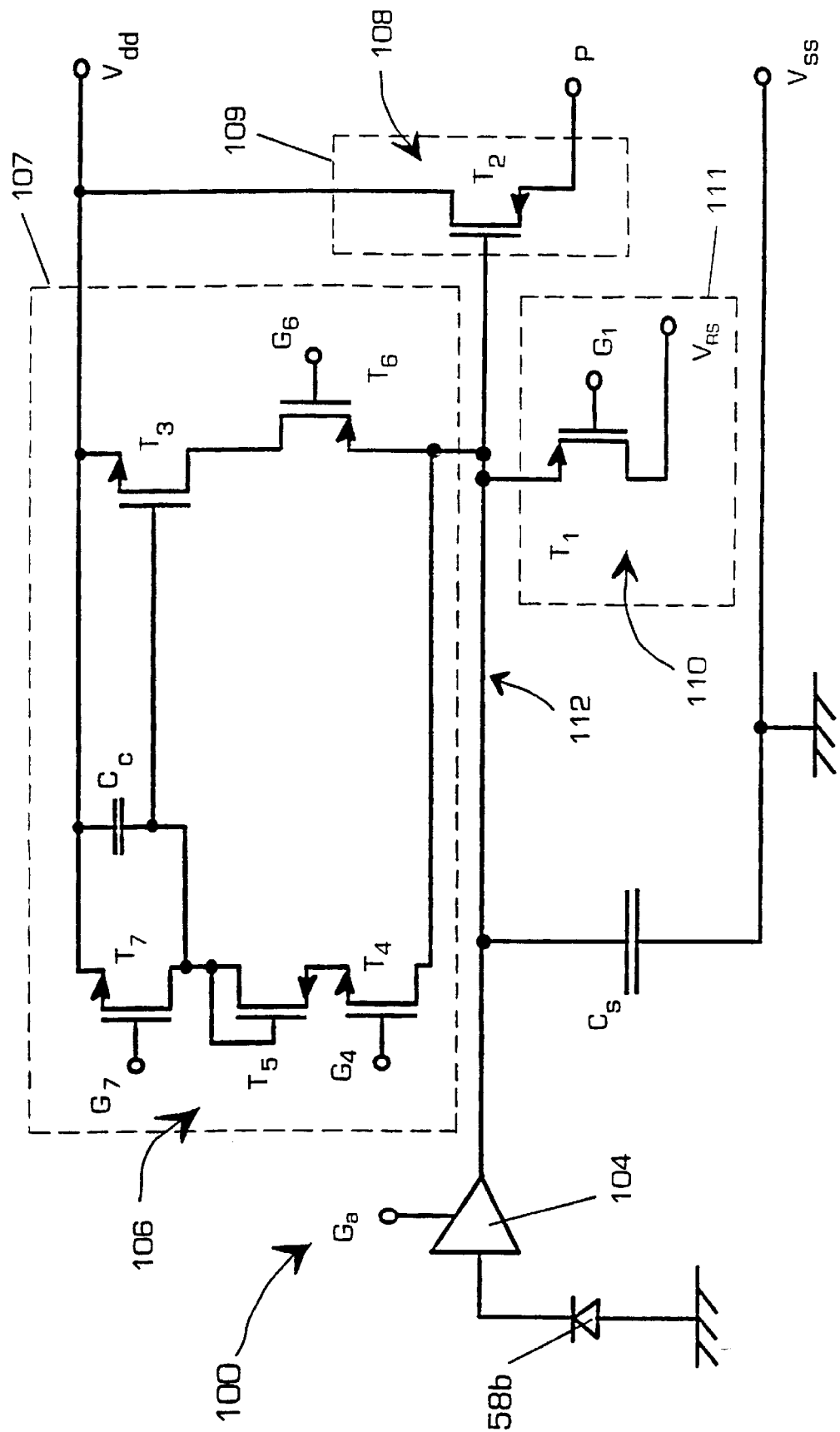
FIG. 6 is a diagram of a prior art signal processing circuit incorporated into the array in FIG. 5.

Referring now to FIG. 6, there is shown a prior art signal processing circuit indicated generally by 100. Circuit components are connected together as shown. This is described in the patent no. U.S. Pat. No. 5,155,348. The circuit 100 is replicated for each element 58 on the substrate 56.

The circuit 100 comprises a preamplifier 104 connected to its respective photodiode element 58b, a programmable current source 106 shown contained within a dotted line 107, an integration capacitor $C_s$, an output buffer 108 shown contained within a doffed line 109 and a reset circuit 110 shown contained within a dotted line 111. The circuit 100 is shown connected to a signal ground $V_{ss}$ and to supplies $V_{RS}$, $V_{dd}$. A control line $G_a$ is connected to the amplifier 104 for enabling or disabling its output which is connected to an electrical node indicated generally by 112.

The reset circuit 110 comprises a n-channel metal-oxide-semiconductor field effect transistor (MOS FET) $T_1$. The transistor $T_1$ incorporates a gate electrode connected to a control line $G_1$, and two channel electrodes connected to the node 112 and to the supply $V_{RS}$ respectively. $V_{RS}$ is nominally 4 volts relative to the ground $V_{ss}$.

The output buffer 108 comprises a n-channel MOS FET $T_2$ configured as a source follower incorporating a gate electrode connected to the node 112 and two channel electrodes connected to the supply $V_{dd}$ and an output P respectively. The output P is connected to the multiplexer 66 incorporated into the integrated circuit 60 for combining the output of each circuit 100 to provide the output $K_1$. The transistor $T_2$ is arranged to buffer a voltage developed across the capacitor $C_s$ from the multiplexer 66.

The current source 106 comprises a storage capacitor $C_c$, p-channel MOS FETs $T_3$, $T_4$, $T_7$ and n-channel MOS FETs $T_5$, $T_6$. The transistors $T_4$, $T_6$, $T_7$ incorporate gate electrodes connected to control lines $G_4$, $G_6$, $G_7$ respectively. The transistor $T_7$ is arranged to discharge the capacitor $C_c$ when the control line $G_7$ is set to make $T_7$ conduct between its channel electrodes. The transistor $T_6$ is arranged to inject a current into the node 112 whose magnitude is determined by a voltage across the capacitor $C_c$ when the line $G_6$ is set to make $T_6$ conduct between its channel electrodes. The transistor $T_4$ is arranged to charge the capacitor $C_c$ when the line $G_4$ is set to make it conduct between its channel electrodes. When the transistor $T_7$ is arranged to be non-conducting and the transistors $T_4$, $T_6$ to be both conducting, the source 106 is in a programming mode where the voltage developed across the capacitor $C_c$ adjusts to maintain a current being extracted from it at the node 112.

The control lines $G_a$, $G_1$, $G_4$, $G_6$, $G_7$ are connected to the logic control circuit 64 incorporated into the integrated circuit 60. This control circuit 64, which is of a conventional design, is arranged to respond to a signal applied to the control input $K_2$ by setting the lines $G_a$, $G_1$, $G_4$, $G_6$, $G_7$ in sequence as described later.

Operation of the prior art sensor apparatus 50 will now be described with reference to FIGS. 5 and 6. The elements 58 and their respective circuits 100 in the array 52 are arranged to operate concurrently during a calibration mode and sequentially during a measurement mode.

The control input $K_2$ is initially set to a calibration state which configures all the circuits 100 in the calibration mode as follows. In each circuit 100, this mode results initially in the lines $G_1$, $G_4$, $G_6$, $G_7$ being set so that the transistors $T_1$, $T_4$, $T_6$, $T_7$ respectively are non-conducting between their channel electrodes and the line $G_a$ being set to disable output from the preamplifier 104. The solenoid 78 responds to $K_2$ by moving the lens 68 into the first position where it projects a partially blurred image of a remote scene, represented by 'S' in FIG. 5, onto the photodiode elements 58. Next, the lines $G_1$ and $G_7$ are set for a period of 1 µsec to charge the capacitor $C_s$ to a voltage difference of nominally $V_{RS}$ across its electrodes and discharge the capacitor $C_c$ respectively.

Next in the calibration mode, a current generated in each element 58, for example the element 58b, in response to the partially blurred image is recorded as a voltage across its respective capacitor $C_c$ as follows. In each circuit, the line $G_a$ is set to enable output from the preamplifier 104, and the lines $G_4$, $G_6$ are set to switch the transistors $T_4$, $T_6$ respectively so that they conduct between their channel electrodes for a period of a few milliseconds. During this period, a current $I_p$ flows between the capacitor $C_s$ and the preamplifier 104 in response to photons incident on its element 58b. The current $I_p$ corresponds to a local pedestal component and a leakage current. During this period, a voltage $V_{Cc}$ developed across the capacitor $C_c$ increases and then stabilises so that a current flowing through the transistors $T_3$, $T_6$ becomes equal to the current $I_p$. At completion of the period, the lines $G_6$, $G_4$ are set to switch the transistors $T_6$, $T_4$ respectively so that they become non-conducting. The voltage $V_{Cc}$ at the end of the period is then a record of the current $I_p$. Parasitic charge injection occurs onto the capacitor $C_c$ when the transistor $T_4$ is switched causing the record of the current $I_p$ to be inaccurate; this inaccuracy will be described in more detail later.

Next, the control input $K_2$ is set to a measurement state which configures each circuit 100 in a measurement mode. The solenoid 78 responds to this state of $K_2$ by moving the lens 68 into the second position where it projects a substantially focused image of the remote scene onto the photodiode elements 58.

There follows then a procedure in each circuit 100 where a current generated in its respective element 58 in response to the focused image is subtracted at the node 112 from the current $I_p$ injected by the source 106 to provided a difference current which is integrated onto the capacitor $C_s$ during an integration period. In the procedure, the line $G_a$ is set to disable output from the preamplifier 104, and the line $G_1$ is set to switch the transistor $T_1$ to conduct for 1 μsec to charge the capacitor $C_s$ to a potential difference of $V_{RS}$ across its electrodes. Next, the fine $G_a$ is set to enable output from the preamplifier 104 for the duration of the integrating period. During this period, the line $G_6$ is also set simultaneously to switch the transistor $T_6$ to make it inject the current $I_p$ onto the capacitor $C_s$. Simultaneous injection of the current $I_p$ and removal of current through the preamplifier 104 in response to the focused image provides the difference current which is integrated onto the capacitor $C_s$ and thereby changes the potential developed its electrodes from $V_{RS}$ by an amount in proportion to the difference current. At the end of the period, the line $G_6$ is set to switch the transistor $T_6$ so that it becomes non-conducting and the line $G_a$ is simultaneously set to disable output from the preamplifier 104. The potential developed across the capacitor $C_s$ is then available at the output P for interrogation by the multiplexer 66. The multiplexer interrogates each circuit 100 to provide the compound output signal from the array 52 at the sensor signal output $K_1$ which corresponds to a spatially filtered representation of the scene.

Generation of the spatially filtered representation of the scene as described above, namely for each element by subtracting a current corresponding to a partially blurred image of the scene from a current corresponding to a focused image of the scene, produces a difference current typically with a dynamic range which is approximately fifty times less than that of earlier equivalents. This diminished range permits the integration period during which the difference current is integrated onto the capacitor $C_s$ of each circuit 100 to be increased, thereby providing a typical improvement in signal-to-noise performance of the apparatus 50 of a factor of seven. This improvement is a square root of a ratio of the dynamic ranges and is achievable whilst retaining feature information of importance for interpreting the scene.

In the apparatus 50, the control $K_2$ input may be repeatedly set in the measurement mode after the calibration mode so that a number of subsequent focused images are filtered in the apparatus 50 after completion of the calibration mode.

The prior art apparatus 50 has a problem that parasitic charge injection occurs onto the capacitor $C_c$ when the transistor $T_4$ is switched causing the record of the current $I_p$ to be inaccurate.

In the circuit 100, rapid switching of the control line $G_4$ results in charge stored in the channel of the transistor $T_4$ and charge coupled via interelectrode capacitance between its gate and first channel electrode being injected onto the capacitor $C_c$ which introduces an offset error. The error may be reduced by switching the line $G_4$ less rapidly so that the charge stored in the channel is given sufficient time to dissipate, but this is undesirable because it reduces apparatus operating speed. Even when the control line $G_4$ is switched less rapidly to allow charge stored in the channel of $T_4$ to dissipate, a residual error resulting from charge injection through the interelectrode capacitance of the transistor $T_4$ will then still remain.

Figure 7:
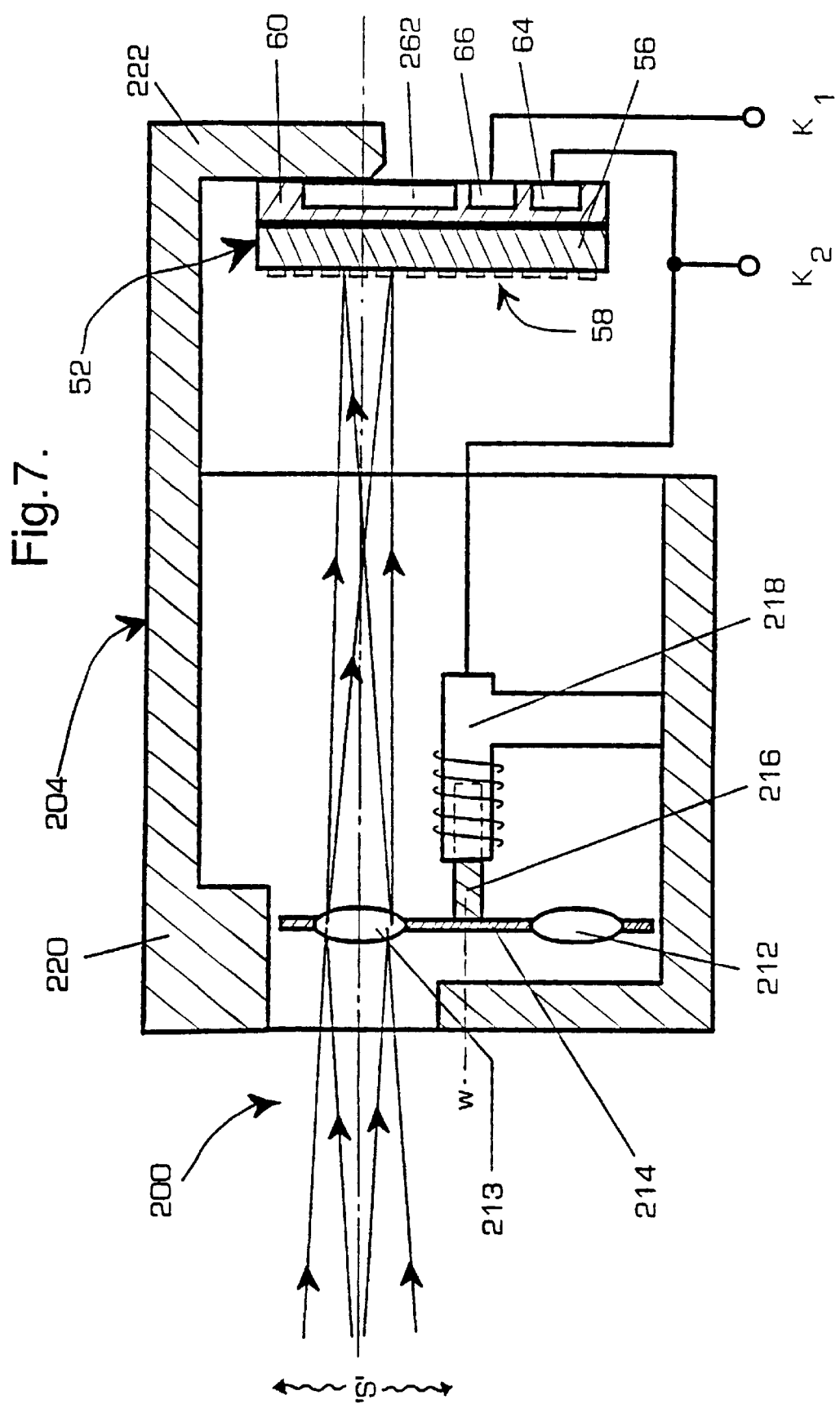
FIG. 7 is a schematic illustration of a sensor apparatus of the invention incorporating a rotatable lens assembly.

Referring now to FIG. 7, there is shown a sensor apparatus of the invention indicated generally by 200 which addresses the residual error described above, by means of a novel signal processing circuit to be described later with reference to FIG. 8. The apparatus 200 comprises a lens assembly 204, and the focal plane array 52 as described above. In FIG. 7, the assembly 204 is arranged to project sequentially images of a remote scene, represented by 'S', onto the array 52. The images are of differing degree of blurring relative to one another. The apparatus 200 operates optically in a similar manner to the apparatus 50 except that the lens 68 and the solenoid 78 are replaced by two germanium lenses 212, 213 of different focal length rotatably mounted on a shaft 216 of a stepper motor 218 for projecting partially blurred and focused images of the remote scene onto the array 52.

The lens assembly 204 comprises the two germanium lenses 212, 213 mounted into holes formed into an opaque disc 214. The disc 214 is rotationally mounted onto the shaft 216 of the motor 218 which is secured into an opaque frame 220. The frame 220 incorporates a member 222 onto which the array 52 is mounted. The member 222 also incorporates liquid nitrogen and Pelter cooling facilities (not shown) for cooling the array 62. The lenses 212, 213 are arranged to be of differing focal length so that a focused image of a remote scene is projected by the lens 212 onto the array 52 when the disc 214 is rotated by the motor 218 about an axis w to a first angular position and a partially blurred image is projected by the fens 213 onto the array 52 when the disc 214 is rotated about the axis w to a second angular position. Angular position of the disc 214 is selectable by providing appropriate control signals to the motor 218. A compound output signal is provided from the array 52 at a sensor signal output $K_1$. A control input $K_2$ is provided for controlling the motor 218 and the array 52 from remote units (not shown).

The apparatus 200 provides an advantage compared to the apparatus 50 in that the disc 214 may be rotated rapidly, for example in excess of twenty revolutions per second, thereby providing more rapid recalibration and updating of spatially filtered image output at the output $K_1$.

Figure 8:
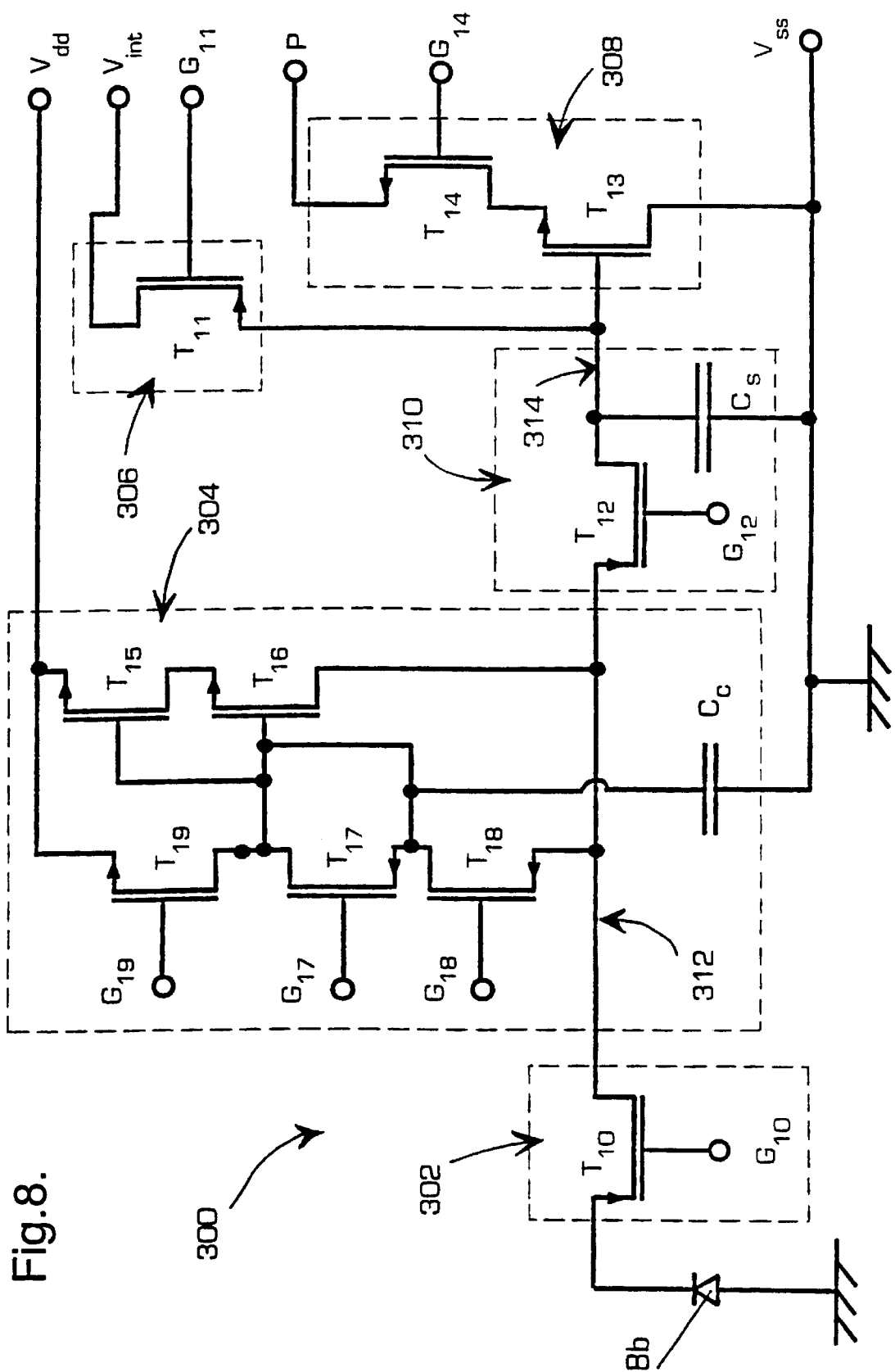
FIG. 8 is a diagram of a signal processing circuit incorporated into the apparatus in FIG. 7.

Referring now to FIG. 8, there is shown a diagram of a signal processing circuit indicated generally by 300. Each circuit 300 is connected to its respective photodiode element 58 in FIG. 7. Components of the circuit 300 are connected together as shown. The circuits 300 are incorporated into the integrated circuit 60 and are indicated by 262.

The circuit 300 comprises a switchable impedance buffer indicated by 302, a programmable current source indicated by 304, a reset circuit indicated by 306, an output circuit indicated by 308 and an integration circuit indicated by 310. The circuit 300 is arranged to be connected to the signal ground $V_{ss}$ and the supply $V_{dd}$. The reset circuit 306 is arranged to be connected to a supply $V_{int}$ of intermediate voltage between the ground $V_{ss}$ and the supply $V_{dd}$.

The buffer 302 incorporates a n-channel MOS FET $T_{10}$ arranged to be enabled and disabled from a control line $G_{10}$ connected to its gate electrode. Its second channel electrode is connected to a node indicated generally by 312. The transistor $T_{10}$ is arranged to operate as an impedance converter in common gate configuration and to present an input impedance for the element 58b which is less than an equivalent shunt resistance of the element 58b when represented as a Norton current source. The transistor $T_{10}$ provides an input impedance of $1/gm$ at its first channel electrode where gm is a transconductance of the transistor $T_{10}$.

The current source 304 is arranged to inject a current from the supply $V_{dd}$ onto the node 312 depending upon a voltage developed across its storage capacitor $C_c$. It comprises n-channel MOS FETs $T_{17}$, $T_{18}$ with their gate electrodes connected to control lines $G_{17}$, $G_{18}$ respectively, p-channel MOS FETs $T_{15}$, $T_{16}$, $T_{19}$ and a storage capacitor $C_c$. The transistor $T_{19}$ incorporates a gate electrode which is connected to a control line $G_{19}$.

The line $G_{17}$ is a logically inverted version of the line $G_{18}$. The transistor $T_{17}$ incorporates a short channel so that its gate-channel capacitance is approximately half, namely in a range of 25% to 75%, that of the transistor $T_{18}$ and its channel electrodes are shorted together so that it does not impede current flow through the transistor $T_{18}$ to the capacitor $C_c$. The transistors $T_{15}$, $T_{16}$ are arranged to form a self cascoding current source. This arrangement provides an output impedance at a first channel electrode of the transistor $T_{16}$ connected to the node 312 for low source currents of approximately 100 nA which is a hundred times greater than that provided at a channel electrode of a single MOS FET configured as a current source as in the prior art circuit 100. This considerably improves accuracy of the circuit 300 compared to the circuit 100 in FIG. 6. Moreover, the self cascoding current source generally provides a faster dynamic response than a single MOS FET configured as a current source thereby providing more rapid stabilisation of the circuit 300 compared to the circuit 100. The capacitor $C_c$ is arranged to provide a capacitance of 500 fF between its electrodes which is a compromise between:

(i) providing a large enough capacitance to store a signal for subtraction;

(ii) reducing errors arising from charge dumping from interelectrode capacitances of the transistor $T_{18}$; and (iii) providing a sufficiently small capacitance for the circuit 300 to stabilise within a few milliseconds during a calibration mode.

The reset circuit 306 comprises a n-channel MOS FET $T_{11}$ with its gate electrode connected to a control line $G_{11}$. The transistor $T_{11}$ is arranged to charge an integration capacitor $C_s$ incorporated into the integration circuit 310 to a potential of substantially $V_{int}$ across its terminals.

The output circuit 308 comprise a p-channel MOS FET $T_{13}$ configured as a source follower connected to a n-channel MOS FET $T_{14}$ whose gate electrode is connected to a control line $G_{14}$. The circuit 308 is arranged to provide a buffered output P for the multiplexer 66 corresponding to a voltage $V_{C_s}$ developed across the capacitor $C_s$ at a node indicated by 314.

The integration circuit 310 comprises the capacitor $C_s$ and a n-channel MOS FET $T_{12}$ with its gate electrode connected to a control line $G_{12}$. The transistor $T_{12}$ comprises channel electrodes connected between the nodes 312, 314. The capacitor $C_s$ provides a capacitance of 1 pF between its electrodes which is a compromise between:

(i) limiting integrated circuit surface area occupied by the circuit 300 on the integrated circuit 60; and (ii) providing a sufficiently large capacitance to integrate during an available integration period a difference current which approaches 400 pA.

Operation of the circuit 300 will now be described with reference to FIGS. 7 and 8.

The control input $K_2$ is initially set to a calibration state which configures all the circuits 300 in the integrated circuit 60 in a calibration mode. In each circuit 300, this mode results initially in the control lines $G_{10}$, $G_{11}$, $G_{12}$, $G_{14}$, $G_{18}$, $G_{19}$ being set by the control circuit 64 so that the transistors $T_{10}$, $T_{11}$, $T_{12}$, $T_{14}$, $T_{18}$, $T_{19}$ are non-conducting between their channel electrodes respectively. The motor 218 responds to this state of $K_2$ by moving the lens 213 into a position where it projects a partially blurred image of the remote scene onto the photodiode elements 58.

Next, the capacitors $C_c$, $C_s$ in the current source 304 and the integration circuit 310 respectively of each circuit 300 are charged to a voltage difference of nominally $V_{dd}$, $V_{int}$ across their electrodes respectively. This is achieved by the control circuit 64 switching the transistors $T_{11}$, $T_{19}$ via lines $G_{11}$, $G_{19}$ respectively to conduct between their channel electrodes for a period of 1 µsec.

Next in each circuit 300, a correction signal corresponding to current generated in its respective element 58 in response to incident photons thereon is stored on the capacitor $C_c$ in the source 304. This is achieved by the control circuit 64 setting the lines $G_{10}$, $G_{18}$ so that the transistors $T_{10}$, $T_{18}$ conduct between their channel electrodes respectively for a period of a few milliseconds. During this period, a current flows through the channel electrodes of the transistors $T_{10}$, $T_{15}$, $T_{16}$ in each circuit 300 and through its respective element 58 in response to photons incident upon it. The current stabilises in each circuit 300 to a value $I_p$ corresponding to a local pedestal component present in the image and a leakage current. A feedback loop is established through the transistor $T_{18}$ so that a voltage $V_{Cc}$ develops across the electrodes of the capacitor $C_c$ appropriate for the current source 304 to deliver the current $I_p$. The voltage $V_{Cc}$ stabilises when a condition is attained where a current flowing from the channel electrode of the transistor $T_{16}$ is equal to the current $I_p$. In this condition, the line $G_{18}$ is set so that the transistor $T_{18}$ becomes non-conducting between its channel electrodes. The voltage $V_{Cc}$ in each circuit 300 at the end of the period is then a record of the current $I_p$ from its respective element 58.

Next, the control input $K_2$ is set to a measurement state which configures each circuit 300 in a measurement mode. There then follows a procedure where the motor 218 responds to this logic state of $K_2$ by moving the lens 212 into a position where it projects a focused image of the remote scene onto the photodiode elements 58. Once this procedure has been completed, the control line $G_{12}$ is set so that the transistor $T_{12}$ in each circuit 300 conducts between its channel electrodes for a duration of an integration period. During this period, current $I_p$ flows from the first channel electrode of the transistor $Ti_6$ in each circuit 300 and a current $I_d$ flows through its respective element 58 in response to photons incident upon it. A difference current corresponding to $I_p$–$I_d$ flows between the channel electrodes of the transistor $T_{12}$ and is integrated onto the capacitor C, and changes a voltage $V_{C_s}$ difference across its electrodes during the integration period. At completion of the period, the control line $G_{12}$ is set to switch the transistor $T_{12}$ so that it becomes non-conducting between its channel electrodes. Next, the multiplexer 66 interrogates each circuit 300 by setting the control line $G_{14}$ so that the transistor $T_{14}$ conducts between its channel electrodes and thereby provides a buffered signal at the output P. The multiplexer 66 interrogates each circuit 300 in the integrated circuit 60 to provide the compound output signal from the array 52 at the output $K_1$ which corresponds to a spatially filtered representation of the scene.

The circuit 300 provides the advantage compared to the circuit 100 that it is possible to achieve more accurate subtraction of signals generated in response to the images projected onto the array 52 during calibration and measurement modes. In the circuit 100, rapid switching of the control line $G_4$ results in charge stored in the channel of the transistor $T_4$ and charge coupled via interelectrode capacitance between its gate and first channel electrode being injected onto the capacitor $C_c$ and therefore in introduction of an offset error. The error may be reduced by switching the line $G_4$ less rapidly so that the charge stored in the channel is given sufficient time to dissipate. However, a residual error resulting in charge injection through the interelectrode capacitance will then still remain. The circuit 300 at least partially alleviates the residual error. The control lines $G_{17}$ and $G_{18}$ are arranged to be switched in antiphase with respect to one another so that a compensating charge is extracted from the capacitor $C_c$ through an interelectrode capacitance formed between channel electrodes and the gate electrode of the transistor $T_{17}$ when the line $G_{17}$ is switched. The compensating charge counteracts charge injected onto the capacitor $C_c$ through the transistor $T_{18}$ from interelectrode capacitance formed between the gate electrode and the second channel electrode of the transistor $T_{18}$ when the control line $G_{18}$ is switched.

Examples of the invention may incorporate different elements as follows:

(i) the germanium lenses 212, 213 transmissive to infrared radiation may be substituted with silica glass lenses transmissive to visible light radiation, namely radiation whose wavelength is in a range of 0.3 µm to 1 µm; and (ii) the photodiode elements 58 may be correspondingly arranged to be responsive to visible light radiation.

This enables the apparatus 200 to be used for providing spatially filtered outputs of scenes emitting visible light radiation. The photodiode elements 58 may be substituted with MOS or CCD devices for sensitising the apparatus 200 to visible light radiation.

The lenses 212, 213 may be replaced by shaped mirror assemblies arranged to project images of a remote scene onto the array 52. Mirrors are able to project images of a remote scene over a wider range of radiation emission frequencies than is possible with germanium or silica glass lenses.

The lenses 212, 213 may be replaced by one or more Fresnel zone plates arranged to provide a focusing characteristic and thereby project an image onto the array 52. This provides an advantage that the zone plates may be fabricated to have a lower mass of typically a few grammes compared to the lenses 212, 213, thereby allowing more rapid rotation of the disc 214 and therefore more frequent updating of spatially filtered image output at the output $K_1$ from the array 52.

A partially blurred image may be projected onto the array 52 during the calibration mode with a degree of blurring selectable either by a human operator or automatically from the remote units connected to the apparatus 200 to achieve a desired degree of filtration in the output $K_1$. Moreover, a uniform blurred image of the scene may be projected by the lens 213 onto the array 52, thereby allowing the apparatus 200 to be used to provide a relative radiometer output as well as a apparatus providing more accurate image filtration.

A substantially focused image and a partially blurred image may be projected onto the array 52 during the calibration mode and the measurement mode respectively, such that a signal is recorded on the capacitor $C_c$ in each circuit 300 corresponding to a substantially focused image. This provides an advantage that image tone reversal in the sensor signal at the output $K_1$ is thereby achieved.

Furthermore:

(i) a fixed lens, namely a lens not rotatably mounted on the disc 214 but mounted in constant position relative to the frame 220 in its lens assembly 204, may be used to project a focused image onto the elements 52; and (ii) a rotatably mounted diffusing shutter on the disc 214 may be movable between first and second positions depending upon the control input $K_2$ to the version of the apparatus 200.

The shutter may be positioned in the first position so that it does not intercept radiation passing through the lens assembly 204 to its array 52, and in the second position so that it scatters radiation passing through it from the lens assembly 204 to its array 52. The shutter may incorporate a ground glass plate which transmits and scatters visible radiation whilst attenuating only substantially 5% of radiation incident thereupon. It provides a scattering characteristic where radiation received by an element 58 at a central region of the array 52, namely a reference element, when the shutter is in the first position is scattered so that 90% of it illuminates in a range of nearest adjacent elements to the reference element to 64% of elements 58 contiguous to the reference element in the array 52 in the second position; 64% of elements here corresponds to $G_{max}=0.4$ h in FIG. 1.

When the output $K_1$ corresponds to subtraction of response of each element 58 in the array 52 to the diffuse image of the scene from its response to the non-diffuse image of the scene, defects due to flicker noise and variations in element offset and responsivity, namely FPN, are reduced in the data provided at the output $K_1$ compared to output directly from the array 52 during measurement mode. Defects due to temperature dependence of element offset and responsivity with temperature are also reduced in the output $K_1$.

The output $K_1$ may be displayed on a screen, stored in a memory device for future display or further processing, or printed where the apparatus 200 forms part of an electronic camera apparatus. The memory device may be a rewritable EEPROM which provides data retention when electrical supply to it is removed.

The array 52 may be substituted with a CCD array. When a CCD array is employed, the apparatus 200 will provide similar advantages as for the array 52 incorporating MOS photodetectors, namely reduction in flicker noise, FPN and offset drift.

The shutter may incorporate, instead of the ground glass plate, at least one of translucent plastic sheet, tracing paper, microprism sheet, one or more Fresnel plates, and one or more phase plates for diffusing radiation from the scene. The shutter may be pivotally mounted as in a standard (SLR) reflex camera. Alternatively, it may be mounted on a rotatable carrier for rapid insertion and extraction between the array 52 and the lens assembly 204. Alternatively, the shutter and its actuating mechanism may be replaced by a liquid crystal spatial light modulator configured to operate between clear and partially opaque states. The liquid crystal modulator may be a polymer dispersed liquid crystal device (PDLC) configured to scatter visible radiation transmitted through it in one state and transmit light substantially unscattered through it in another state in response to bias potential applied thereto. The PDLC incorporates droplets of nematic liquid crystal dispersed in a continuous isotropic polymer matrix. Moreover, the apparatus 200 may be operated so that it alternately executes its calibration mode and measurement mode, or configured to execute its measurement mode a number of times before returning to its calibration mode. Furthermore, the apparatus may also be configured when viewing the scene to execute the measurement mode first followed by the associated calibration mode; this provides an advantage where the apparatus is employed in a stills camera of allowing the operator to capture a view of the scene immediately without first having to execute the calibration mode.

However, it is not always practical to execute the calibration mode for each measurement mode when the apparatus 200 is incorporated into a video camera because of a relatively high frame update rate of approximately 50 frames/second employed. It is preferable in video cameras incorporating the apparatus 200 to execute the calibration mode only when illumination or temperature change because element responsivity is influenced by these environmental factors. The calibration mode may be executed manually by the operator pressing a switch incorporated into the apparatus 200 to instruct it to perform the calibration mode. Alternatively, the apparatus 200 may be configured to perform the calibration mode automatically.

The apparatus 200 may be used with multielement arrays 52 whose elements each incorporate one or more of a cadmium-mercury-telluride photodiode, a photodiode with MOS readout, a phototransistor with MOS readout, a photogate with MOS readout and a photodiode with CCD readout.

Although embodiments of the invention described above are arranged to be responsive to infrared and visible radiation, the invention may in an alternative embodiment be arranged to respond to ultrasonic, microwave or X-ray radiation by employing a multielement array responsive to such radiation and employing one or more focusing devices, such as reflectors or zone plates, arranged for such radiation to project images of differing degree of blurring relative to one another onto the array. For X-rays, the array may incorporate a plurality of scintillators responsive to received X-ray radiation by emitting visible light which is subsequently amplified by a multichannel image intensifier.

In the sensor apparatus 200, a blurred image of a calibration object may be projected onto the array 52 during the calibration mode as an alternative to projecting a defocused or diffuse image of the scene 'S' thereonto for generating a calibration signal for each element 58.

What is claimed is:

1. A sensor apparatus for generating a sensor signal corresponding to a filtered image of a scene, the apparatus incorporating:
   (i) detecting means incorporating a plurality of detector elements and arranged to derive first and second element signals during first and second detection phases respectively; and
   (ii) processing means associated with each element for deriving a difference signal from the element signals for use in generating the sensor signal;
   wherein the processing means incorporates compensating means for counteracting inaccuracies introduced in response to switching the sensor apparatus between detection phases.

2. A sensor apparatus according to claim 1 wherein the processing means incorporates:
   (i) storing means including a storage capacitor for recordal of a calibration signal therein derived from the first element signal during the first phase; and
   (ii) current injecting means for injecting current onto the capacitor during the first phase and for providing a current during the second phase in response to the calibration signal recorded during the first phase for use in generating the difference signal, said injection means comprising a programmable current source incorporating self-cascoding MOSFETs.

3. A sensor apparatus according to claim 1 wherein:
   (i) the processing means incorporates storing means including a storage capacitor for recordal of a calibration signal therein derived from the first element signal during the first phase; and
   (ii) the compensating means incorporates a compensating capacitor comprising first and second electrodes, the first electrode connected to the storage capacitor for injecting a compensating charge thereonto and the second electrode arranged to be driven by a compensating signal for counteracting inaccuracies introduced into the storing means when the sensor apparatus is switched between detection phases.

4. A sensor apparatus according to claim 3 wherein the compensating signal is in antiphase to a signal applied to the processing means for selecting the phases.

5. A sensor apparatus according to claim 3 wherein the compensating capacitor comprises a compensating MOSFET whose channel electrodes are shorted together to provide one of the electrodes of the capacitor and whose gate electrode is arranged to provide another of the electrodes of the capacitor.

6. A sensor apparatus according to claim 5 wherein the storing means incorporates an enabling MOSET for switching itself from the first phase where it stores its respective calibration signal into its storage capacitor to the second phase where it provides the calibration signal, and the compensating MOSFET incorporates a short channel so that its gate-channel capacitance is substantially half that of the enabling MOSFET.

7. A sensor apparatus according to claim 1 wherein the elements and the processing means are integrated together onto a substrate.

8. A sensor apparatus according to claim 1 wherein the processing means incorporates interfacing means for interfacing from the processing means to its respective element and for presenting an input impedance to the element less than an equivalent internal impedance of the element, said interfacing means comprising a MOSFET configured in common gate configuration.

9. A sensor apparatus according to claim 1 further including projecting means for projecting first and second images onto the detecting means during the first and second phases respectively, where:
   (i) at least one of the images is a projection of radiation from the scene; and
   (ii) the images are of a differing degree of blurring to one another but neither being fully defocused and each retaining discernible spatial features, thereby enabling the sensor apparatus to provide the sensor signal corresponding to a spatially filtered image of the scene.

10. A sensor apparatus according to claim 9 wherein each degree of blurring is such that radiation from a scene element focussable upon a single element becomes dispersed over a number of elements in the range of one element to 25% of the elements in the detecting means.

11. A sensor apparatus according to claim 9 wherein the images are blurred to a degree which is manually or automatically selectable.

12. A sensor apparatus according to claim 9 wherein the second image is blurred to a greater degree than the first image.

13. A sensor apparatus according to claim 9 wherein at least one of the first and second images is a diffuse image.

14. An apparatus according to claim 13 wherein the projecting means is arranged so that radiation corresponding to that receivable on one element from a focused image is received by between two elements and 64% of the elements when the image is diffuse.

15. An apparatus according to claim 13 wherein the projecting means incorporates a liquid crystal spatial light modulator configured to be controllable between a first state where it substantially transmits radiation unscattered and a second state where it transmits and scatters radiation from the scene to the detecting means for generating different degrees of blurring for the first and second images.

16. An apparatus according to claim 15 wherein the liquid crystal spatial light modulator is a polymer dispersed liquid crystal device (PDLC) configured to scatter radiation transmitted through it in one state and transmit light substantially unscattered through it in another state, said states being selectable in response to a control potential applied to the device.

17. A sensor apparatus according to claim 1 wherein each element comprises at least one of a cadmium-mercury-telluride photodiode, a photodiode with MOS readout, a phototransistor with MOS readout, a photogate with MOS readout and a photodiode with CCD readout.

18. A method of generating a signal corresponding to a filtered image of a scene including the steps of:
  i) using a detector having a plurality of detector elements to derive first and second element signals from each detector element during first and second detection phases respectively; and
  ii) processing detector element signals from both detection phases to generate a sensor signal in which fixed pattern noise is counteracted, wherein step (ii) incorporates:
    (iii) counteracting inaccuracies introduced in response to switching the sensor apparatus between detection phases.

19. A method according to claim 18, wherein the processing step (ii) incorporates:
  i) storing on a storage capacitor a calibration signal derived from a first element signal;
  ii) injecting current on to the storage capacitor during the first phase using a programmable current source incorporating self-cascoding MOS FETs;
  iii) during the second phase providing a calibration current responsive to the calibration signal; and
  iv) generating a difference signal from the calibration current and a second element signal.

20. A method according to claim 19, wherein:
  i) the processing step includes storing on a storage capacitor a calibration signal derived from a first element signal during the first phase; and
  ii) the step of counteracting inaccuracies incorporates applying a compensating signal to a compensating capacitor arranged to inject a compensating charge on to the storage capacitor.

21. A method according to claim 20, wherein the compensating signal is in antiphase with a signal applied to the processing means for selecting the detection phases.

22. A method according to claim 20, wherein the compensating capacitor has first and second electrodes and comprises a compensating MOSFET having channel electrodes which are shorted together to provide the first electrode, the compensating MOSFET also having a gate providing the second electrode.

23. A method according to claim 22, further including the step of switching between detection phases with the aid of an enabling MOSFET to switch the storage capacitor between storing a calibration signal in the first detection phase and providing a calibration signal in the second detection phase, the compensating MOSFET incorporating a short channel and having a gate-channel capacitance which is substantially half that of the enabling MOSFET.

24. A sensor apparatus for generating a sensor signal corresponding to a filtered image of a scene, the apparatus incorporating:
  i) a detector incorporating a plurality of detector elements and arranged to derive first and second element signals during first and second detection phases respectively; and
  ii) a respective signal processing circuit associated with each detector element for processing detector element signals from both detection phases to generate a sensor signal in which fixed pattern noise is counteracted; wherein the signal processing circuit incorporates a compensating circuit for counteracting inaccuracies introduced in response to switching the sensor apparatus between detection phases.

25. A sensor apparatus according to claim 24, wherein the signal processing circuit incorporates:
  i) a storage capacitor for storing a calibration signal therein derived from the first element signal during the first phase; and
  ii) injection circuitry for injecting current on to the storage capacitor during the first phase and for providing a current during the second phase responsive to the calibration signal for use in generating the sensor signal, the injection circuitry comprising a programmable current source incorporating self-cascoding MOSFETs.

26. A sensor apparatus according to claim 24, wherein:
  i) the signal processing circuit incorporates a storage capacitor for storing a calibration signal derived from the first element signal; and
  ii) the compensating circuit incorporates a compensating capacitor for injecting a compensating charge onto the storage capacitor arranged to receive a compensating signal for counteracting inaccuracies introduced into the storage capacitor when the sensor apparatus is switched between detection phases.

27. A sensor apparatus according to claim 26, wherein the compensating signal is in antiphase with a signal applied to the processing means for selecting the detection phases.

28. A sensor apparatus according to claim 26, wherein the compensating capacitor has first and second electrodes and comprises a compensating MOSFET having channel electrodes which are shorted together to provide the first electrode, the compensating MOSFET also having a gate providing the second electrode.

29. A sensor apparatus according to claim 28, wherein it incorporates an enabling MOSFET for switching the storage capacitor between storing a calibration signal in the first detection phase and providing a calibration signal in the second detection phase, and the compensating MOSFET incorporates a short channel and has a gate-channel capacitance which is substantially half that of the enabling MOSFET.

* * * * *